US011117426B1

(12) United States Patent
Tigges (10) Patent No.: US 11,117,426 B1
(45) Date of Patent: Sep. 14, 2021

(54) ROTARY TRANSMISSION LEADTHROUGH AS PART OF A TIRE PRESSURE CONTROL SYSTEM

(71) Applicant: PTG Reifendruckregelsysteme GmbH, Neuss (DE)

(72) Inventor: Martin Tigges, Neuss (DE)

(73) Assignee: PTG REIFENDRUCKREGELSYSTEME GMBH, Neuss (DE)

( * ) Notice: Subject to any disclaimer, the term of this patent is extended or adjusted under 35 U.S.C. 154(b) by 0 days.

(21) Appl. No.: 17/211,318

(22) Filed: Mar. 24, 2021

(51) Int. Cl.
*B60C 23/00* (2006.01)

(52) U.S. Cl.
CPC .. *B60C 23/00336* (2020.05); *B60C 23/00318* (2020.05); *B60C 2200/08* (2013.01)

(58) Field of Classification Search
CPC ............ B60C 23/003; B60C 23/00336; B60C 23/00345; B60C 2200/08; B60C 23/00318
See application file for complete search history.

(56) References Cited

U.S. PATENT DOCUMENTS

| 1,800,780 A | 4/1931 | Daneel |
| 1,865,231 A | 6/1932 | Buck |
| 1,969,225 A | 8/1934 | Lear |

(Continued)

FOREIGN PATENT DOCUMENTS

| DE | 547256 | 3/1932 |
| DE | 827605 | 1/1952 |

(Continued)

*Primary Examiner* — Kip T Kotter
(74) *Attorney, Agent, or Firm* — Polson IP Law, PC; Margaret Polson; Christopher Sylvain (57) ABSTRACT

A rotary transmission leadthrough is part of a tire pressure control system for a tire of a vehicle, the tire having a hub mounted in a rotatable manner on an axle, the rotary leadthrough having a stator unit mounted on the axle of the tire in such a manner that its position in the axial direction is adjustable relative to the axle. The stator unit has a disc like end member and a bearing member extending in the axial direction from the end member with a bearing surface on its outer radial surface, the end member projecting outwards in a radial direction from the bearing surface. The bearing member retains an inner bearing shell of a rolling bearing carrying the hub. A connector is mounted on the end member connected to an air supply of the tire pressure control system, and an air conduit connecting the connector with an air passage extending in the axial direction under the bearing surface. An opening in the bearing surface connects to the air passage with an air chamber arranged radially to the outside of the bearing surface. A rotor unit connects to the hub in a torque fit manner, and the rotary unit is arranged radially outside to the bearing member of the stator unit and has a connector in a radial outside position connected to the tire valve of a tire mounted on the hub. An air conduit connecting the connector with the air chamber is arranged between the rotary unit and the bearing member; and a sealing unit is arranged between the bearing surface of the stator unit and the rotary unit having at least two sealing rings held in place and arranged with a spacing between them in the axial direction, the spacing defining the air chamber.

20 Claims, 4 Drawing Sheets

(56) References Cited

U.S. PATENT DOCUMENTS

| | | | |
|---|---|---|---|
| 2,128,623 A | | 7/1937 | Stuck |
| 2,095,912 A | | 10/1937 | Boyd |
| 2,361,890 A | | 10/1944 | Watson |
| 2,418,730 A | | 4/1947 | Schule |
| 2,854,020 A | | 9/1958 | Williams |
| 3,180,349 A | | 4/1965 | Steer et al. |
| 4,072,048 A | | 2/1978 | Aryan |
| 4,418,737 A | * | 12/1983 | Goodell ............... B60C 23/00 137/224 |
| 4,739,813 A | | 4/1988 | Pagani |
| 4,768,574 A | | 9/1988 | Probst |
| 4,836,235 A | | 6/1989 | Pagani |
| 4,917,163 A | | 4/1990 | Schultz |
| 5,035,255 A | | 7/1991 | Geiger |
| 5,174,839 A | * | 12/1992 | Schultz ............... B60C 23/003 152/415 |
| 5,309,969 A | | 5/1994 | Mittal |
| 5,816,284 A | | 10/1998 | Lin |
| 6,363,985 B1 | | 4/2002 | Beesley |
| 6,427,714 B2 | | 8/2002 | Freigang et al. |
| 6,439,044 B1 | | 8/2002 | Tigges |
| 6,510,882 B1 | | 1/2003 | Aryidsson et al. |
| 6,550,511 B2 | | 4/2003 | Nienhaus |
| 7,287,565 B2 | | 10/2007 | Hottebart et al. |
| 7,931,061 B2 | | 4/2011 | Gonska et al. |
| 8,783,314 B2 | | 7/2014 | Tigges |
| 8,967,182 B2 | | 3/2015 | Tigges |
| 9,352,622 B2 | | 5/2016 | Tigges |
| 9,452,644 B2 | * | 9/2016 | Keeney ............... B60C 23/003 |
| 9,499,015 B2 | * | 11/2016 | Bittlingmaier ...... B60B 27/0047 |
| 9,539,865 B2 | * | 1/2017 | Lakin ................... B60C 23/003 |
| 9,649,893 B2 | * | 5/2017 | Wagemann ........... F16L 27/087 |
| 10,035,384 B2 | * | 7/2018 | Keeney ................ B60C 23/003 |
| 10,661,612 B2 | | 5/2020 | Linzbach |
| 2002/0023676 A1 | | 2/2002 | Reinhardt |
| 2002/0112802 A1 | * | 8/2002 | D'Amico .............. B60C 23/003 152/415 |
| 2003/0089874 A1 | | 5/2003 | Hall et al. |
| 2004/0113424 A1 | | 6/2004 | Tries et al. |
| 2005/0028865 A1 | | 2/2005 | Nikolayev et al. |
| 2005/0045259 A1 | | 3/2005 | Hottebart et al. |
| 2009/0211682 A1 | | 8/2009 | Sobotzik |
| 2009/0255598 A1 | | 10/2009 | Krug, Jr. et al. |
| 2010/0078109 A1 | | 4/2010 | Wilson et al. |
| 2013/0112327 A1 | * | 5/2013 | Tigges ................. B60C 23/003 152/415 |
| 2013/0343931 A1 | | 12/2013 | Wilson et al. |
| 2015/0174972 A1 | | 6/2015 | Zhou et al. |
| 2015/0203032 A1 | * | 7/2015 | Honig .................... B60B 27/02 340/441 |
| 2016/0152100 A1 | * | 6/2016 | Berkness ................ B60B 35/14 301/6.5 |
| 2019/0009622 A1 | * | 1/2019 | Buhrke ............. B60C 23/00347 |

FOREIGN PATENT DOCUMENTS

| | | |
|---|---|---|
| DE | 202013105026 U1 | 6/2014 |
| EP | 0387495 A1 | 9/1990 |
| EP | 1095799 | 5/2001 |
| FR | 2999266 A1 | 6/2014 |

* cited by examiner

ROTARY TRANSMISSION LEADTHROUGH AS PART OF A TIRE PRESSURE CONTROL SYSTEM

BACKGROUND

Tire pressure regulating systems are used in motor vehicles, for example in utility vehicles such as trucks, tractors or earth-moving machines in order to be able to adapt the tire pressure present in the tire to different operating situations of the motor vehicle. An adaptation of tire pressure takes place primarily as a function of the ground to be traveled on and/or of the load. The contact surface of the tire can be changed by the tire pressure. A tire has a greater contact surface with a lower tire pressure than with a higher tire pressure. For this reason in the case of a soft ground it is preferred to drive with a lower tire pressure and with a higher contact surface than on a firm roadway. The tire pressure can also be changed as a function of the particular loaded state.

Such tire pressure regulating systems comprise a rotary transmission leadthrough in order to transmit compressed air from a compressed-air source on the vehicle to the rotatably supported wheel in order to increase the internal tire pressure. Such a rotary transmission leadthrough comprises a stator structural group arranged on the vehicle and a rotor structural group arranged on the wheel and separated from the stator structural group by a movement slot. Both structural groups are arranged either axially or radially to one another according to the design of the rotary transmission leadthrough. In order to transmit compressed air, stator and rotor comprise annular open grooves or chambers that are opposite one another, relative to the movement slot and face each other and are sealed by activatable seals such as described in EP 1 095 799 B1 for the time of the transmission of compressed air in order to form a chamber for the transmission of compressed air. An air line leading to the wheel rim is provided on the wheel side on the rotor of the rotary transmission leadthrough. This air line extends through the rim in an opening and empties into the inside of the tire. A controllable valve is typically connected into the wheel-side air line and is open for the procedure of regulating the tire pressure and is closed after the conclusion of the procedure. The compressed air itself is made available by a compressor arranged on the vehicle. In any case, for utility vehicles the com-pressor present for operating the brake system typically serves as compressor.

Such rotary transmission leadthroughs are attached to the end face of the axle of a wheel and thus extending the axle in its length. Therefore such rotary transmission leadthroughs can only be arranged on tires, of which their face facing away from the vehicle is free. Therefore tires of vehicles which are held for example in a double sided swingarm, also referred to as dual swingarm, cannot be provided with such rotary transmission leadthrough in order to control and/or regulate the pressure of the tire.

Indeed, there are numerous applications, in which tires are held in between a dual swingarm. This is the case for example with tires of vehicles used for farming, for example planters. Planters are for example used to sow corn. Such a planter is a heavy machinery which is folded up for a towing transport on the road. Then the load of the planter only rests on some of the numerous back wheels. Therefore, when towing such planter with a tractor on the road a rather high tire pressure is beneficial. But, when towing such planter in the field the tire pressure should be a lot lower, because otherwise the wheels will create deep grooves, in which the sowed corn will not grow. At present an intermediate tire pressure is used thus not being optimum for road travel and also not being optimum for field work. Road travel with too little tire pressure damages the tire significantly.

An aspect of the disclosure is to provide a rotary transmission leadthrough as part of a tire pressure control system which can be used also with a tire which is suspended in a manner that a conventional rotary transmission leadthrough cannot be mounted, which is for example the case if the tire is suspended in a dual swingarm. Further, it would be beneficial, if when mounting such rotary transmission leadthrough no adaptions of the tire suspension or other components are necessary.

SUMMARY

The following embodiments and aspects thereof are described and illustrated in connection with systems, tools and methods which are meant to be exemplary and illustrative, not limiting in scope. In various embodiments, one or more of the above described problem have been reduced or eliminated, while other embodiments are directed to other improvements.

The aspect sketched out above is solved with a rotary transmission leadthrough as part of a tire pressure control system for a tire of a vehicle, the tire having a hub mounted in a rotatably manner on an axle, the rotary leadthrough comprising:
  a stator unit mountable on the axle of the tire in such a manner, that its position in the axial direction is adjustable relative to the axle, the stator unit having
    a disc like end member and
    a bearing member extending in the axial direction from the end member with a bearing surface on its outer radial surface, the end member projecting outwards in a radial direction from the bearing surface,
    the bearing member retaining with its end an inner bearing shell of a rolling bearing carrying the hub,
    a connector mounted on the end member to be connected with an air supply of the tire pressure control system,
    an air conduit connecting the connector with an air passage extending in the axial direction under the bearing surface,
    an opening in the bearing surface connecting the air passage with an air chamber arranged radially to the outside of the bearing surface,
  a rotor unit connected to the hub in a torque fit manner, the rotary unit being arranged radially outside to the bearing member of the stator unit and having
    a connector in a radial outside position to be connected to the tire valve of a tire mounted on the hub,
    an air conduit connecting the connector with the air chamber arranged between the rotary unit and the bearing member;
  a sealing unit arranged between the bearing surface of the stator unit and the rotary unit having
    at least two sealing rings held in place and arranged with a spacing between them in the axial direction, the spacing defining the air chamber.

This rotary transmission leadthrough can be used for a tire of a vehicle being suspended in a manner, in which no attachment to the end face of the axle is possible, which is the case for example with a tire being suspended in a dual swingarm. The swingarm itself does not need to be altered. The same benefits are achieved with a tire suspended on a single swingarm, in that the rotary transmission leadthrough can be arranged on the swingarm side thus using the swingarm to hold or guide air conduits. Therefore this rotary transmission leadthrough can be mounted on existing systems and vehicles. The stator unit is mounted on the axle of the tire. The stator unit is in its mounted position adjustable in the axial direction in respect to the axis. The stator unit comprises a disc like end member, of which the diameter typically is slightly larger than the diameter of the end face of the hub carried on the axle. A bearing member is part of the stator unit and reaches with its axial end portion into the axle opening of the hub. This end face of the bearing member abuts the inner bearing shell of a rolling bearing, by which the hub is rotatable arranged on the axle. The lower bearing shell is adjustable in the axial direction in order to define the clearance of the rolling bearing. The stator unit of this rotary transmission leadthrough retains the inner bearing. Therefore the clearance of the rolling bearing is adjustable with the stator unit. Thus, the stator unit of this rotary transmission leadthrough also has the functionality of conventional clearance adjusting system with an adjustment nut, a pressure disc and a press ring, which are needed in order to adjust the clearance of the rolling bearing in conventional hub-axle-arrangements. The stator unit, which is arranged in the axial direction in respect of the axis outside of the rotary unit, is mounted on the axle in a radial direction. These are the main reasons why this the rotary transmission leadthrough does not need more space in the axial direction than any conventional hub-axle-arrangement without such rotary transmission leadthrough.

Tires suspended in dual swingarms are fixed with their axle to such swingarm, typically using a mounting bolt introduced and threaded into a threaded opening of the end face of the axle. With the rotary transmission leadthrough this arrangement of the swingarm can be used to lock the stator unit in the position needed for the control of the clearance to the rolling bearing. Typically the stator unit is threaded onto the threaded end section of the axle. The mounting force of the swingarm induced into the side face of the end member of the stator unit presses the threads of the stator unit in the axial direction towards those of the axle and thus securely locks the stator unit that no turning movement relative to the axle is possible. The adjusted position of the stator unit is therefore secured reliably. It is also possible to secure the stator unit with the axle by using a set screw, which is introduced into the stator unit in the radial direction and is forced against the threaded section of the axle.

The end member of the stator unit carries at least one connector arranged typically on the radial outside surface thereof. The connector is used to connect the rotary transmission leadthrough with an air supply. The air supply can be for example a compressor driven by the motor of a vehicle towing for example the trailer with its tires suspended in dual swingarms. Inside the bearing member the stator unit has an air passage which is connected by an air conduct to the connector. The air passage has an opening in the radial direction leading into an air chamber on the radial outside of the bearing member.

The rotary unit is mounted in a torque tight manner to the hub, for example by using a coupling section which is introduced into the end face opening of the hub and which is press fitted against the radial inside face of this opening. This inner face of the hub is normally used to arrange a sealing ring to seal the rolling bearing from the outside. When using this mounting concept no amendments need to be carried out with the hub in order to mount the rotary unit of the rotary transmission leadthrough. The rotary unit encloses the bearing member of the stator unit. Sealing rings arranged within the clearance between the radial outside surface of the bearing member and the radial inside surface of the rotary unit, which are spaced apart from each other in the axial direction define the air chamber between them. The rotary unit carries a connector, which communicates through an air conduit with the air chamber. Connected to the connector is a conduct providing a fluid communication between the connector and the tire valve. When air is introduced into the connector of the stator unit this will be brought into the air chamber and through this into the connector of the rotary unit and from there to the tire valve. Depending whether the tire is to be inflated or deflated air can travel through this rotary transmission leadthrough depending on the conception of the system in both directions.

Such rotary transmission leadthroughs can be designed as a one channel system or a more channel system, in particular a two channel system. Tire pressure control systems working with a two channel system a first channel is used for the air which is to be inflated to the tire or deflated from it. The other channel is a pneumatic control channel to control the tire valve, which means to open or close it. In a two channel system this pneumatic control can also be used to bring the tire valve into a deflation position so that in case the tire shall be deflated the air exits at the tire valve and does not need to travel all the way through the system to the control unit. In case of a two or more channel system the stator unit and the rotary unit carry one or more further connectors. In case the second channel is used for pneumatic control signals the diameter of the air conduits, the air passage and the air chamber can be dimensioned with a smaller cross sectional area.

The sealing rings, of which two enclose an air chamber in the clearance between the bearing member of the stator unit and the rotary unit are held in place by snap rings. Each of these is retained in a circumferential groove within the rotary unit or the bearing member of the stator unit. Since the bearing member has the air passages inside it is preferred to arrange these grooves retaining the snap rings in the surface of the rotary unit facing to the complementary surface of the bearing member. Then the radial extension of the bearing member of the stator unit can be kept small although the diameter of the air passage still being sufficient large to allow an air stream volume as needed to travel therethrough.

According to a preferred embodiment the stator unit carries on its outside face of its disc like end member a collar overlapping the end section of the rotary unit. The collar therefore overlaps the clearance between the rotary unit and the stator unit in axial direction and prevents that dirt or other contaminations enter into the clearance between the rotary unit and the stator unit. The end section of the rotary unit may have a circumferential groove at its peripheral outside, which is partly also typically overlapped by the collar of the stator unit. This groove is used as a water drain hindering water to flow into the clearance between the rotary unit and the stator unit. Water flowing in the axial direction from the hub to the end of the hub will flow into this groove, flow within the groove to the downside and then simply drop out of the groove due to gravity.

In addition to the exemplary aspects and embodiments described above, further aspects and embodiments will become apparent by reference to the accompanying drawings wherein like reference characters designate corresponding parts in the several views.

DETAILED DESCRIPTION OF THE DRAWINGS

Figure 1:
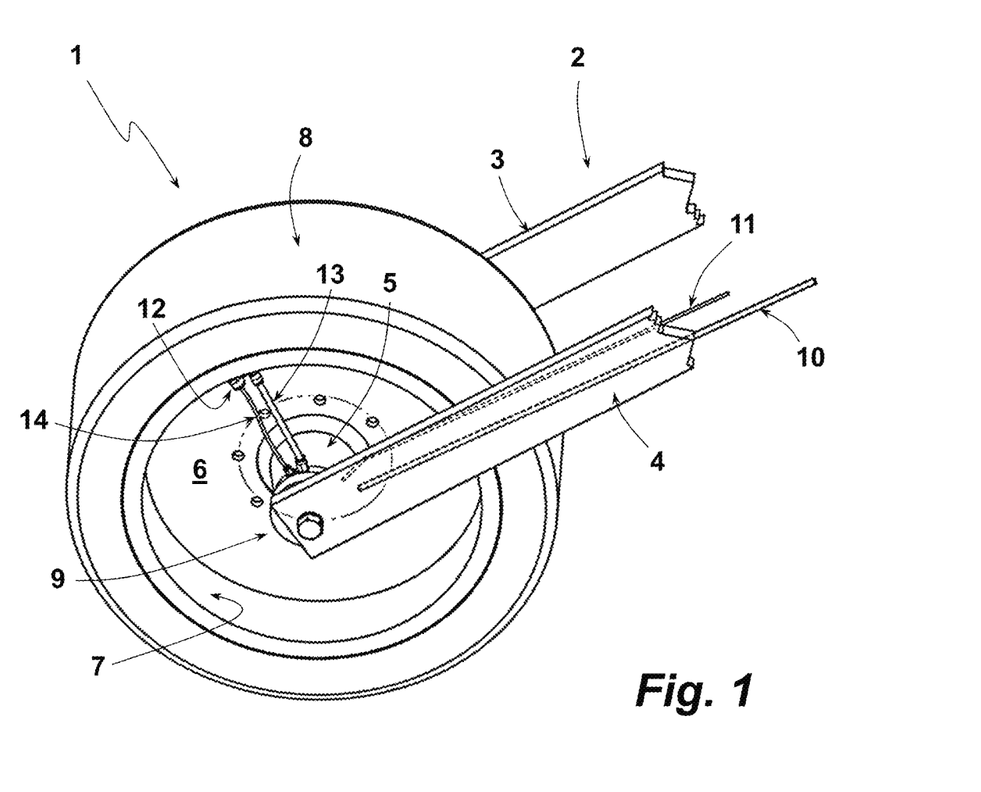
FIG. 1: Schematic perspective view of a tire suspended in a dual swingarm with a rotary transmission leadthrough as part of a tire pressure control system.

The tire 1 of a farming vehicle, for example a planter, is suspended in a dual swingarm 2. The two swingarms of the dual swingarm are marked with reference numerals 3 and 4. These swingarms 3, 4 are mounted on the end faces of the axle of the tire 1. Rotatably mounted on the axle is a hub 5, on which a wheel disc 6 with its rim 7 carrying the actual tire 8 is mounted. Attached to the axle and the hub 5 is a rotary transmission leadthrough 9, which will be described in further detail with reference to the following figures. The rotary transmission leadthrough 9 of the depicted embodiment is part of a two channel tire pressure control system. Swingarm 4 carries a first conduit 10 connected to an air supply and a second conduit 11 which is used to transmit pneumatic control signals to a tire valve 12 fastened to the rim 7. The conduits 10, 11 have a different cross sectional areas. To transmit the pneumatic control signals less air is needed. Therefore the conduit 11 has a smaller cross sectional area than conduit 10, which is used for the flow of air to be introduced into the tire 8 through its tire valve 12. Conduits 10, 11 are connected to a stator unit of the rotary transmission leadthrough. The rotary unit of the rotary transmission leadthrough 9 is connected via conduits 13, 14 to the tire valve 12.

Figure 2:
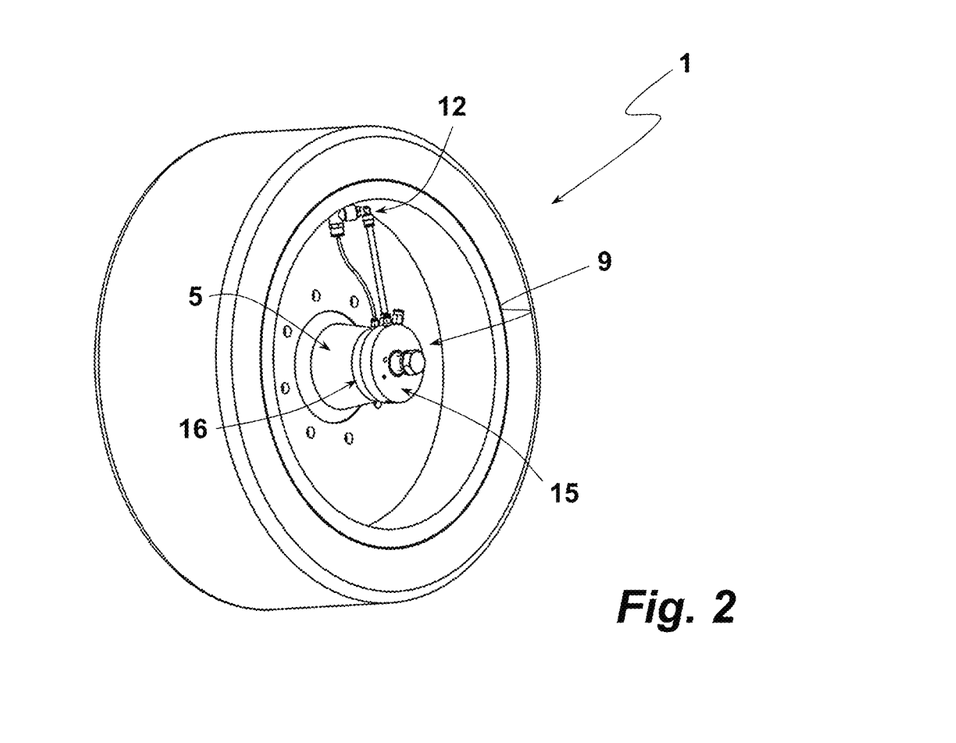
FIG. 2: the tire depicted in FIG. 1 without the dual swingarm.

Conduit 10 is connected to an air supply of the vehicle towing the farming vehicle (of which in FIGS. 1 and 2 a tire is depicted). The air supply is controlled by a control unit. The control unit measures the air pressure within the tire 8. Part of the control unit is a pneumatic control device, with which pneumatic control signals can be sent via conduit 11 and the rotary transmission leadthrough 9 to the tire valve 12. With such pneumatic signals the tire valve 12 can be controlled in respect of its open and/or closed position.

In FIG. 2 the rotary transmission leadthrough 9 with its stator unit 15 and its rotary unit 16 is better to be seen, since FIG. 2 shows the tire 1 without the swingarm 4.

Figure 3:
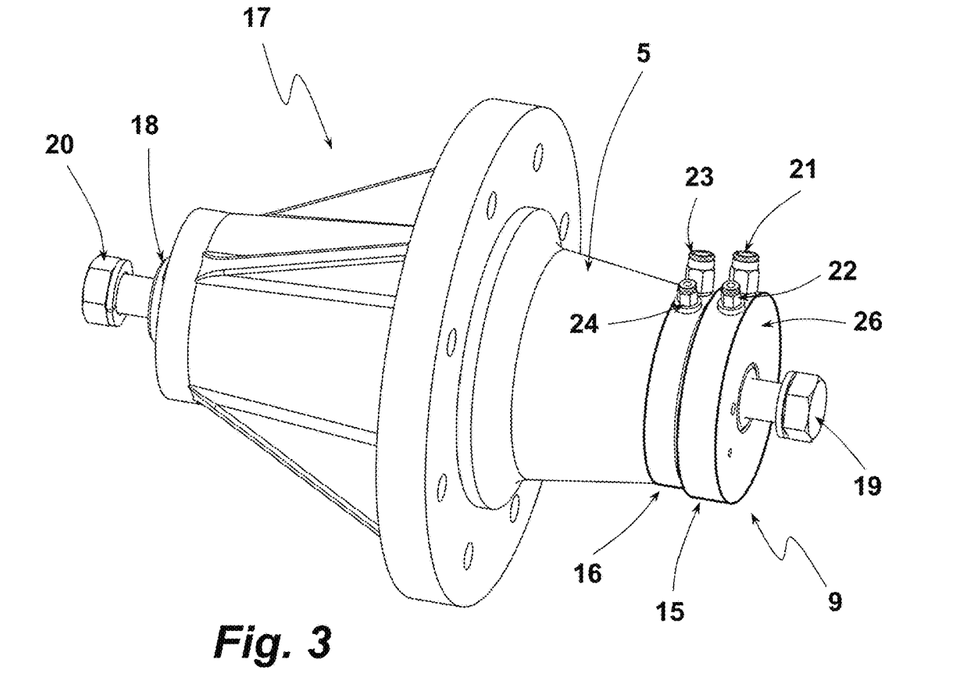
FIG. 3: the hub-axle-component of the tire of the previous figures with the rotary transmission leadthrough.

The hub-axle-component 17 with the rotary transmission leadthrough 9 is visualized in FIG. 3 in a perspective view. The axle can be identified with reference numeral 18. The stator unit 15 is since mounted to the axle 18 part of it. Bolts 19, 20 are used to mount the hub-axle-component 17 between the two swingarms 3, 4 of the dual swingarm 2. The axle is mounted between the two swingarms 3, 4 in a torsion tight manner.

Conduit 10 is connected to a first connector 21 of the stator unit 15. Conduit 11 is connected to a second connector 22 of the stator unit 15. Also arranged on the radial outside of the rotary unit 16 two connectors 23, 24 are arranged. These are connected to conduits 13, 14 linking the rotary unit 16 with the tire valve 12.

Figure 4:
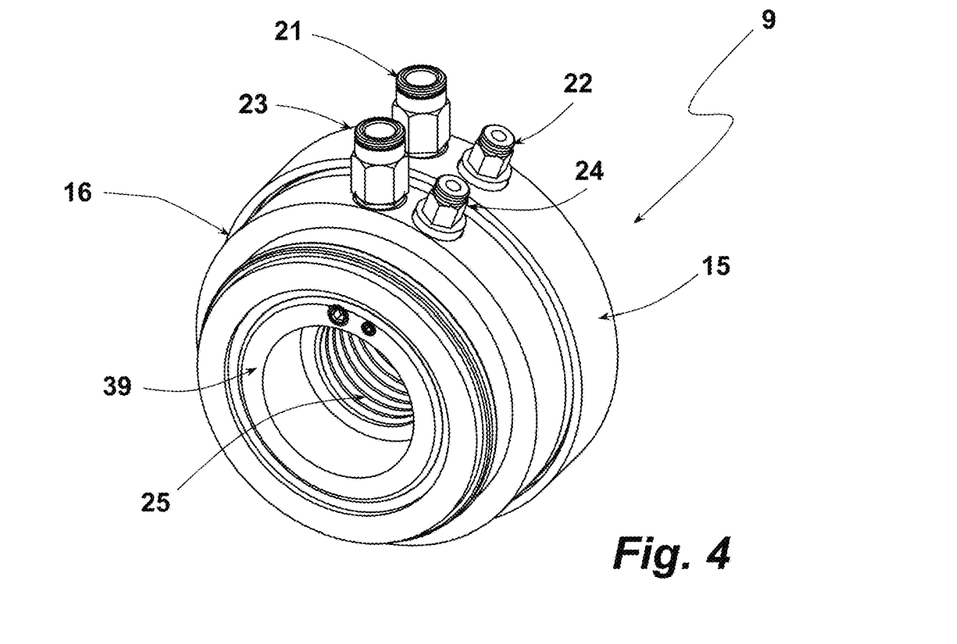
FIG. 4: the rotary transmission leadthrough in a perspective view.

FIG. 4 shows the rotary transmission leadthrough 9 without the hub 5. The stator unit 15 has a threaded inside section 25, with which the stator unit 15 is threaded onto an outside thread of the end section of axle 18.

Figure 5:
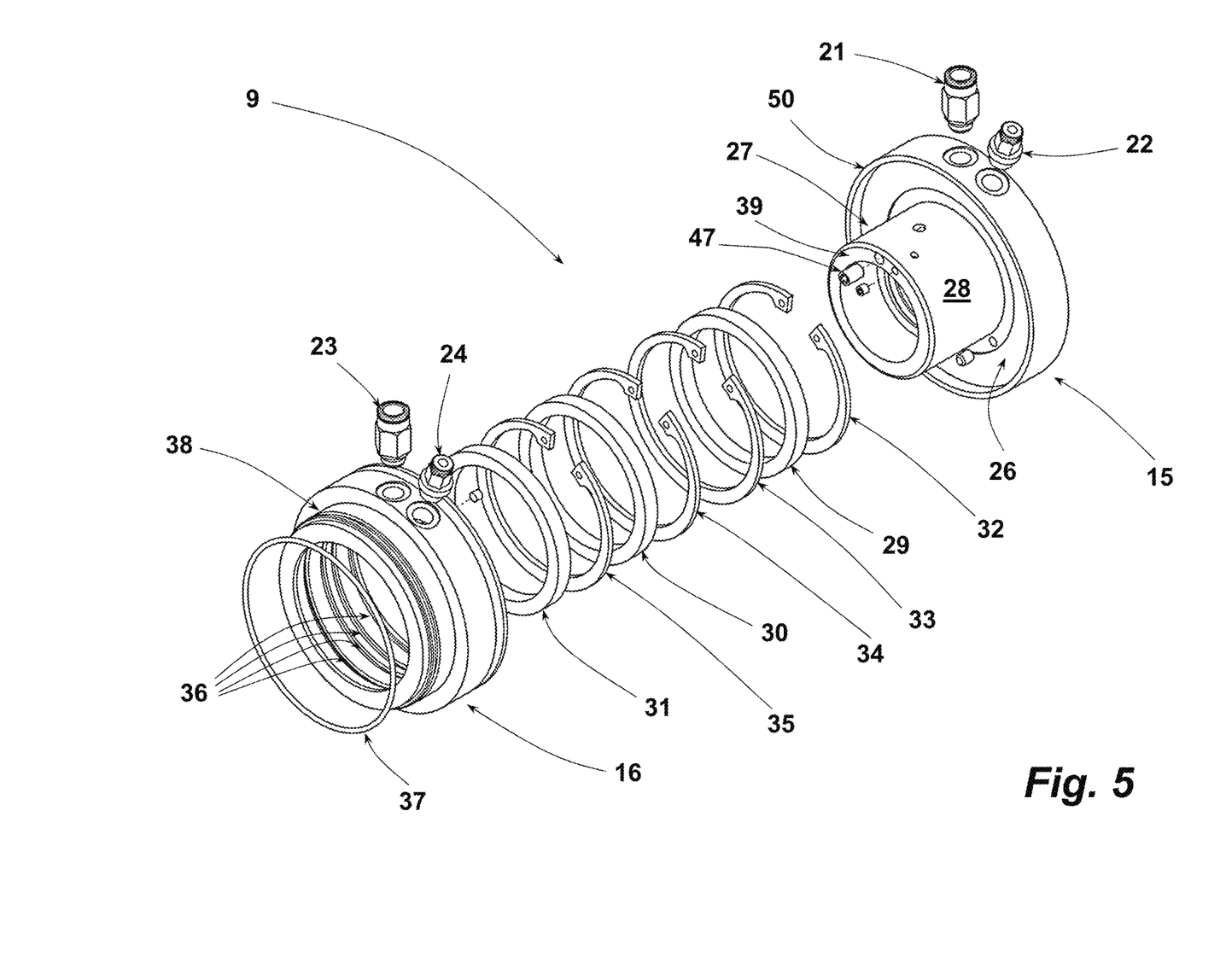
FIG. 5: the rotary transmission leadthrough in an exploded view.

The rotary transmission leadthrough 9 with its components is depicted in FIG. 5 in an exploded view. The stator unit 15 comprises a disc like end member 26, on the radial outside of which the two connectors 21, 22 are arranged. Part of the stator unit 15 is also a bearing member 27, of which the outer cylindrical surface 28 is a bearing surface. Arranged on the bearing surface are three sealing rings 29, 30, 31, which are in a sliding engagement with the surface 28 of bearing member 27. The sealing rings 29, 30, 31 are held in place in the axial direction in respect of the surface 28 by snap rings 32-35. The snap rings 32-35 are retained in circumferential grooves introduced into the radial inner surface of the rotary unit 16. These grooves can be identified in FIG. 5 with reference numeral 36. The rotary unit 16 is a ring component surrounding the bearing member 27 with its bearing surface 28 of the stator unit 15. Mounted on the radial outside surface of the rotary unit 16 are the two connectors 23, 24.

An O-ring 37 is arranged on the radial outside surface, introduced into a circumferential groove of a connection section 38 of the rotary unit 16.

Figure 6:
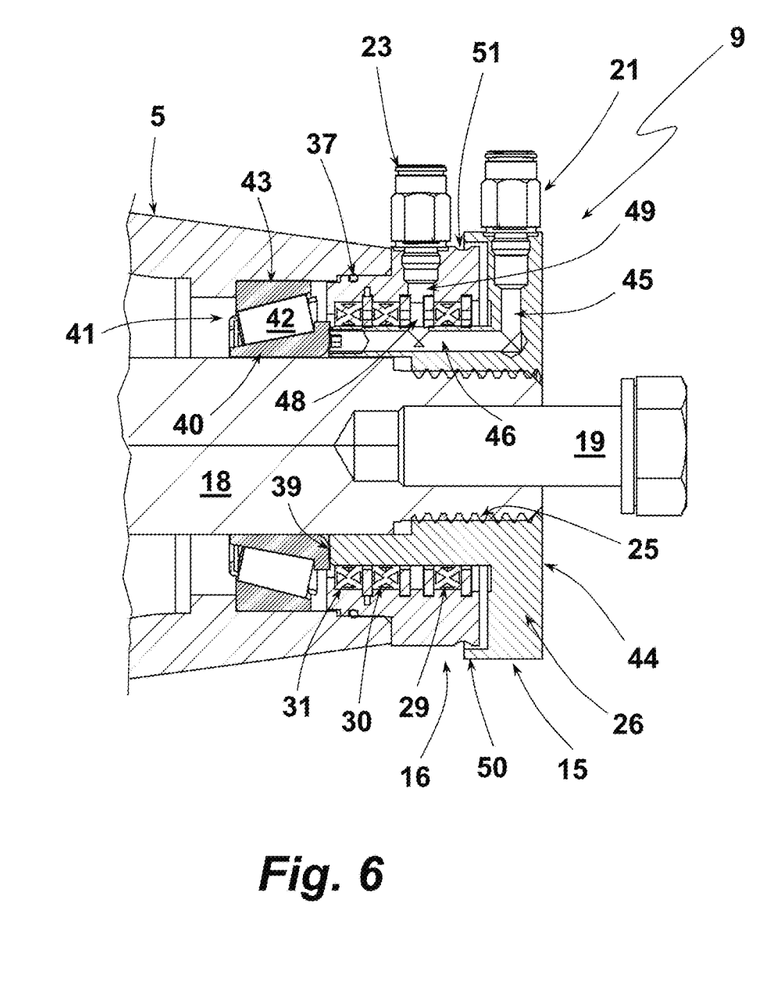
FIG. 6: a cross section along the axis of the hub with the rotary transmission leadthrough in a first section.

In the cross section depicted in FIG. 6 showing the rotary transmission leadthrough 9 mounted on the hub-axle-component 17 shows the threaded engagement of the stator unit 15 with the end section of the axle 18. The axial front face 39 of the bearing member 27 abuts with the axial end face of an inner bearing shell 40 as part of a rolling bearing 41, by which the hub 15 is rotatably suspended on the axle 18. The rolling components are tapered rollers 42. The inner bearing shell 40 can be moved in a certain amount in the axial direction in order to adjust the clearance of the tapered rollers 42 between the inner bearing shell 40 and an outer bearing shell 43. Due to the abutting engagement of the end face 39 of the stator unit 15 the clearance of the rolling bearing 41 can be adjusted with the stator unit 15 simply by using its threaded engagement with the axle 18.

The rotary unit 16 is press fitted into the end face opening of the hub 5 against the radial inner surface of this opening. The O-ring 37 is basically not necessary but is used in the depicted embodiment for additional sealing reasons. The sealing rings 29, 30, 31 are spaced apart from each other in the axial direction and held in place by the snap rings 32-35. Thus the rotary unit 16 press fitted to the hub 15 is rotatably engaged in respect of the stator unit 15 fastened to the axle 18. The stator unit 15 is secured in its position on the thread of the axle 18, the position controlling the clearance of the rolling bearing 41, by the swingarm (not depicted in FIG. 6) which is forced against the axial end face 44 of the stator unit 15 by the bolt 19.

The design of the rotary transmission leadthrough 9 is very compact and can replace conventional components for controlling the clearance of the rolling bearing and sealing the opening between the hub and the axle 18. Therefore simply by replacing these conventional components by the rotary transmission leadthrough 9 can be retrofitted to existing tires suspended in a dual swingarm. Of course, it is also possible to arrange the rotary transmission leadthrough 9 also with a tire suspended with a single swingarm. Then the rotary transmission leadthrough can be arranged on the side of the swingarm using the swingarm to guide the conduits connecting the rotary transmission leadthrough with the tire pressure control system.

The stator unit 15 has connected to its connector 21 an air conduit 45 connecting the connector 21 with an air passage 46. The air passage 46 is an axial boring introduced into the bearing member 27, which is closed from the side of its end face 39 by a closure 47 (see FIG. 5). On the radial outside of the air passage 46 an opening connects the air passage 46 with an air chamber 48 arranged between the bearing member 27 and the rotary unit 16. The width of the air chamber 48 is defined by the distance of the two sealing rings 29, 30 from each other on the surface 28 of the bearing member 27. An air conduit 49 connects connector 23 with the air chamber 48. Air entering connector 21 of the stator unit 15 will flow through this fluid communication to the connector 23 of the rotary unit 16 and from there to the tire valve 12.

The disc like end member 26 of the stator unit 15 carries on its side facing to the rotary unit a collar 50 overlapping the end section of the rotary unit. In this end section of the rotary unit 16 a circumferential groove 51 is introduced. The collar 50 prevents dirt and other contaminants to enter into the clearance gap between the axial end face of rotary unit 16 and stator unit 15. The groove 51 is used as a gutter to drain fluids, for example water, and hindering it from entering into the clearance gap between the rotary unit 16 and the stator unit 15.

Figure 7:
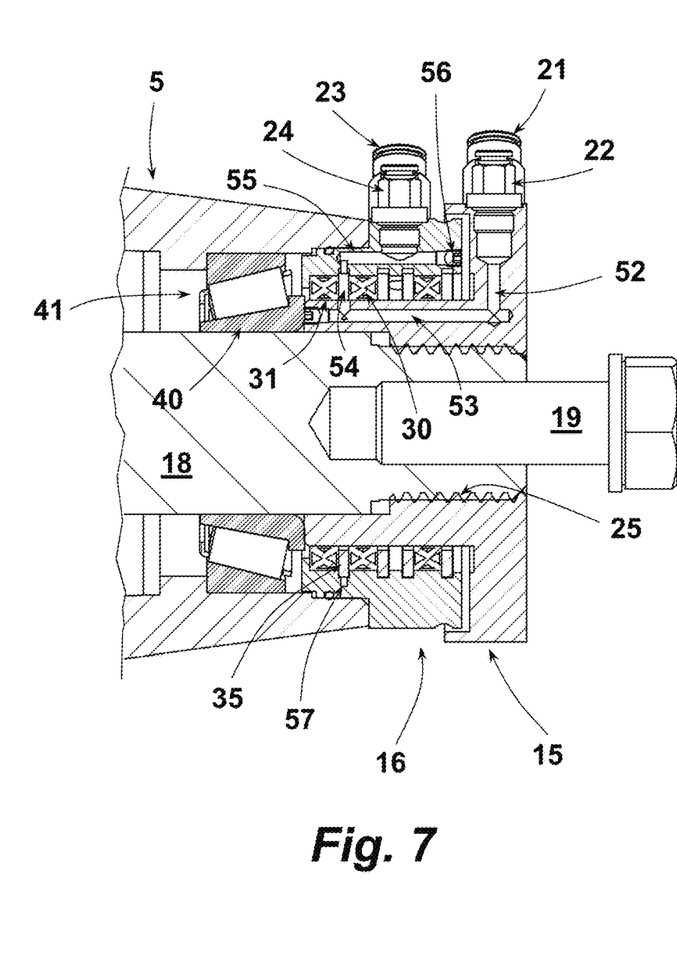
FIG. 7: a cross section along the axis of the hub with the rotary transmission leadthrough in a second section.

The transmission of pneumatic signals between connector 22 of the stator unit 15 and the connector 24 of the rotary unit 16 is accomplished in the same manner, the only difference being that the cross sectional area of the flow path is smaller and that the air chamber is provided between the sealing rings 30, 31. This is depicted in FIG. 7. Connector 22 is connected to an air conduit 52 and by this to an air passage 53 leading trough an opening through the bearing surface 28 into an air chamber 54 defined by the distance of sealing rings 30, 31 from each other in the axial direction. The air chamber 54 is connected via air conduit 55 to the connector 24 of the rotary unit 16 in order to provide a sufficient and easy to manufacture fluid connection between the air chamber 54 to the air conduit 55. The air passage 55 is introduced into the rotary unit 16 from its axial outside direction. This bore is closed to the outside by a closure 56. The connection to the air chamber 54 is achieved by a connection groove 57, which is an extension of the groove, in which the snap ring 35 is held.

The comparison between the two sections of FIG. 6 and FIG. 7 show the difference in the cross sectional area of the fluid path connecting connectors 21 and 23 compared to the fluid path connecting connectors 22 and 24.

REFERENCE NUMERALS

| | |
|---|---|
| 1 | tire |
| 2 | dual swingarm |
| 3 | swingarm |
| 4 | swingarm |
| 5 | hub |
| 6 | wheel disc |
| 7 | rim |
| 8 | actual tire |
| 9 | rotary transmission leadthrough |
| 10 | conduit |
| 11 | conduit |
| 12 | tire valve |
| 13 | conduit |
| 14 | conduit |

-continued

REFERENCE NUMERALS

| | |
|---|---|
| 15 | stator unit |
| 16 | rotary unit |
| 17 | hub-axle-component |
| 18 | axle |
| 19 | bolt |
| 20 | bolt |
| 21 | connector |
| 22 | connector |
| 23 | connector |
| 24 | connector |
| 25 | section |
| 26 | end member |
| 27 | bearing member |
| 28 | surface |
| 29 | sealing ring |
| 30 | sealing ring |
| 31 | sealing ring |
| 32 | snap ring |
| 33 | snap ring |
| 34 | snap ring |
| 35 | snap ring |
| 36 | groove |
| 37 | O-ring |
| 38 | connection section |
| 39 | end face |
| 40 | inner bearing shell |
| 41 | rolling bearing |
| 42 | tapered roller |
| 43 | outer bearing shell |
| 44 | end face |
| 45 | air conduit |
| 46 | air passage |
| 47 | closure |
| 48 | air chamber |
| 49 | air conduit |
| 50 | collar |
| 51 | groove |
| 52 | air gap |
| 53 | air passage |
| 54 | air chamber |
| 55 | air conduit |
| 56 | closure |
| 57 | connection groove |

The invention claimed is:

1. A rotary transmission leadthrough as part of a tire pressure control system for a tire of a vehicle, the tire having a hub mounted in a rotatable manner on an axle, the rotary leadthrough comprising:
   a stator unit mountable on the axle of the tire in such a manner, that its position in the axial direction is adjustable relative to the axle, the stator unit having
      a disc like end member and
      a bearing member extending in the axial direction from the end member with a bearing surface on its outer radial surface, the end member projecting outwards in a radial direction from the bearing surface,
      the bearing member configured to retain, with its end opposite the end member, an inner bearing shell of a rolling bearing carrying the hub,
      a connector mounted on the end member to be connected with an air supply of the tire pressure control system,
      an air conduit connecting the connector with an air passage extending in the axial direction under the bearing surface,
      an opening in the bearing surface connecting the air passage with an air chamber arranged radially to the outside of the bearing surface;
   a rotary unit which connects to the hub in a torque fit manner, the rotary unit being arranged radially outside to the bearing member of the stator unit and having a connector in a radial outside position to be connected to a tire valve of the tire, an air conduit connecting the connector with the air chamber arranged between the rotary unit and the bearing member;

a sealing unit arranged between the bearing surface of the stator unit and the rotary unit having at least two sealing rings held in place and arranged with a spacing between them in the axial direction, the spacing defining the air chamber.

2. Rotary transmission leadthrough according to claim 1, wherein the stator unit has a threaded portion which threads onto a threaded end section of the axle.

3. Rotary transmission leadthrough according to claim 2, wherein the end member of the stator unit is held torque tight by a swingarm fastened to the axle.

4. Rotary transmission leadthrough according to claim 3, wherein the swingarm is fastened to the axle by a bolt threaded into an end face of the axle.

5. Tire pressure control system comprising the rotary transmission leadthrough according to claim 4, and further comprising:
a control unit,
the air supply,
wherein the rotary transmission leadthrough is connected to the control unit and the air supply,
the rotary transmission leadthrough is mounted on the hub and the axle of the tire, and
the rotary unit is in fluid connection with the tire valve.

6. Tire pressure control system comprising the rotary transmission leadthrough according to claim 3, and further comprising:
a control unit,
the air supply,
wherein the rotary transmission leadthrough is connected to the control unit and the air supply,
the rotary transmission leadthrough is mounted on the hub and the axle of the tire, and
the rotary unit is in fluid connection with the tire valve.

7. Tire pressure control system comprising the rotary transmission leadthrough according to claim 2, and further comprising:
a control unit,
the air supply,
wherein the rotary transmission leadthrough is connected to the control unit and the air supply,
the rotary transmission leadthrough is mounted on the hub and the axle of the tire, and
the rotary unit is in fluid connection with the tire valve.

8. Rotary transmission leadthrough according to claim 1, wherein the sealing rings are held in place in the axial direction of the leadthrough by snap rings, each snap ring resting in a circumferential groove provided in the bearing surface of the stator unit or in a complementary surface of the rotary unit.

9. Tire pressure control system comprising the rotary transmission leadthrough according to claim 8, and further comprising:
a control unit,
the air supply,
wherein the rotary transmission leadthrough is connected to the control unit and the air supply,
the rotary transmission leadthrough is mounted on the hub and the axle of the tire, and
the rotary unit is in fluid connection with the tire valve.

10. Rotary transmission leadthrough according to claim 1, wherein the end member of the stator unit has a collar extending in the axial direction overlapping a clearance gap between the end member and the rotary unit.

11. Rotary transmission leadthrough according to claim 10, wherein the collar overlaps an end section of the rotary unit which faces the stator unit.

12. Rotary transmission leadthrough according to claim 11, wherein the end section of the rotary unit has a circumferential groove introduced into its outer surface, the groove being at least partially covered by the collar of the stator unit.

13. Tire pressure control system comprising the rotary transmission leadthrough according to claim 12, and further comprising:
a control unit,
the air supply,
wherein the rotary transmission leadthrough is connected to the control unit and the air supply,
the rotary transmission leadthrough is mounted on the hub and the axle of the tire, and
the rotary unit is in fluid connection with the tire valve.

14. Tire pressure control system comprising the rotary transmission leadthrough according to claim 11, and further comprising:
a control unit,
the air supply,
wherein the rotary transmission leadthrough is connected to the control unit and the air supply,
the rotary transmission leadthrough is mounted on the hub and the axle of the tire, and
the rotary unit is in fluid connection with the tire valve.

15. Tire pressure control system comprising the rotary transmission leadthrough according to claim 10, and further comprising:
a control unit,
the air supply,
wherein the rotary transmission leadthrough is connected to the control unit and the air supply,
the rotary transmission leadthrough is mounted on the hub and the axle of the tire, and
the rotary unit is in fluid connection with the tire valve.

16. Rotary transmission leadthrough according to claim 1, wherein the rotary unit has a coupling section which is introduced into an end face opening of the hub and is press fitted with its radial outer surface to a radial inner surface of the end face opening of the hub.

17. Rotary transmission leadthrough according to claim 16, wherein the coupling section of the rotary unit carries an O-ring held in a circumferential groove thereof.

18. Tire pressure control system comprising the rotary transmission leadthrough according to claim 16, and further comprising:
a control unit,
the air supply,
wherein the rotary transmission leadthrough is connected to the control unit and the air supply,
the rotary transmission leadthrough is mounted on the hub and the axle of the tire, and
the rotary unit is in fluid connection with the tire valve.

19. Rotary transmission leadthrough according to claim 1, wherein the connector of the stator unit is a first connector, and the stator unit has a second connector mounted on its end member, the second connector to be connected to a control unit, wherein the connector of the rotary unit is a first connector, and the rotary unit has a second connector in a radial outside position to be connected to the tire valve of the tire, wherein the stator unit has a second air conduit connecting the second connector with a second air passage, and wherein the sealing unit provides sealings for two air chambers, whereby a pneumatic control signal from the control unit controls operation of the tire valve via the second connectors of the stator and rotary units, and the air supply is connected to an inside of the tire when the tire valve is in an open position via the first connectors of the stator and rotary units.

20. Tire pressure control system comprising the rotary transmission leadthrough according to claim 1, and further comprising:

a control unit, the air supply, wherein the rotary transmission leadthrough is connected to the control unit and the air supply, the rotary transmission leadthrough is mounted on the hub and the axle of the tire, and the rotary unit is in fluid connection with the tire valve.

* * * * *